United States Patent [19]
Takehara et al.

[11] Patent Number: 6,009,108
[45] Date of Patent: Dec. 28, 1999

[54] MULTIPLEXER SYSTEM FOR CONVERTING VARIABLE-LENGTH BURST DATA STREAMS INTO AVERAGED-TRANSFER-RATE FIXED-LENGTH PACKETS

[75] Inventors: Hideki Takehara, Yokohama; Ichiro Ando, Yokosuka, both of Japan

[73] Assignee: Victor Company of Japan, Ltd., Yokohama, Japan

[21] Appl. No.: 08/711,418

[22] Filed: Aug. 30, 1996

[30] Foreign Application Priority Data

Aug. 31, 1995 [JP] Japan .................................. 7-248479

[51] Int. Cl.⁶ ........................................................ H04J 3/02
[52] U.S. Cl. ............................................ 370/538; 370/471
[58] Field of Search ................................. 370/465, 466, 370/471, 473, 474, 538, 539

[56] References Cited

U.S. PATENT DOCUMENTS

| | | | |
|---|---|---|---|
| 5,541,919 | 7/1996 | Yong et al. | 370/471 |
| 5,541,926 | 7/1996 | Saito et al. | 370/474 |

FOREIGN PATENT DOCUMENTS 6343158  12/1994  Japan .

OTHER PUBLICATIONS

Telecommunication Networks: Protocols, Modeling and Analysis, Chapter 2, 1987.

*Primary Examiner*—Chi H. Pham
*Assistant Examiner*—Steven Nguyen
*Attorney, Agent, or Firm*—Pollock, Vande Sande & Amernick

[57] ABSTRACT

A multiplexing system for converting a plurality of variable-length burst data streams supplied from a plurality of data suppliers into a multiplexed averaged-transfer-rate fixed-length packet stream. Within each output period, for each of the input buffers of a multiplexer, a virtual data quantity in the input buffer at the time $t_n$ is calculated by using the length of each output period and average supply rates at time $t_{n-1}$ which are also supplied from the data suppliers. A predetermined amount of data is supplied to a header adder from one of the input buffers which stores data not less than the predetermined amount during the output period from time $t_n$ to time $t_{n+1}$.

16 Claims, 7 Drawing Sheets

MULTIPLEXER SYSTEM FOR CONVERTING VARIABLE-LENGTH BURST DATA STREAMS INTO AVERAGED-TRANSFER-RATE FIXED-LENGTH PACKETS

BACKGROUND OF THE INVENTION

1. Field of the Invention

The present invention relates generally to multiplexers and more specifically to multiplexers for providing an appropriately multiplexed stream and for use in the case where a plurality of coded data of moving pictures, audios, etc. are recorded on a recording media such as a disc or transmitted onto a transmission line.

2. Description of the Prior Art

If data generated every moment in a data source is to be transmitted to a device consuming the generated data so that the generated data (time series data) is exactly reproduced in the consuming device, the generated data has to be supplied to the consuming device so as not to overflow or underflow an input buffer of the consuming device. However, the generated data, which is a kind of time series data, may have to be transmitted intermittently, for example, in some bursts every frame period for some reason such as a need of coding, say, moving pictures because of a limitation of the transmission rate.

Thus problems of overflow and/or underflow of the consuming device input buffer arise in multiplexing a plurality of such time series data supplied in a burst mode.

One solution for the overflow problem is to provide the consuming device with a buffer large enough to soak up the difference between the maximum possible rate of data supply to the buffer and the consuming rate. One solution for the underflow problem is, again, to provide the consuming device with a buffer large enough to store an amount of data which will not be exhausted even in the longest intervals between data supplies. However, these solutions require buffers of a large capacity resulting in an increase in the cost. In particular, the latter solution is achieved by delaying the consumption of the time series data, causing another problem in operating the whole system.

Another solution for the above problems is to provide, in the preceding stage of a multiplexer in a transmitter, a system for converting a burst mode input into a constant rate input. If such systems are used for many inputs of various input rates, it is necessary to generate clocks of various frequencies, which increases the cost.

It is therefore an object of the invention to provide a method and a system for multiplexing a plurality of time series data supplied in burst modes without causing any overflow or underflow in a input buffer of the consuming device.

SUMMARY OF THE INVENTION

According to an aspect of the invention, each of a plurality of data suppliers supplies, in the form of variable-length burst data stream, time series data received from one of a plurality of data sources connected to the data supplier to one of a plurality of input buffers of a multiplexer and informs the multiplexer of an average supply rate for a predetermined number of data bursts to be subsequently supplied. When one of said data suppliers starts a data supply for the first time, the multiplexer starts converting the variable-length burst data streams into a multiplexed averaged-transfer-rate predetermined-amount output stream in the following way. Within each output period defined as a time period from time $t_{n-1}$ to time $t_n$ ($n=0, 1, 2, \ldots$: output period number), for each of the input buffers (assumed to be Bi) a virtual data quantity in the input buffer Bi at the time $t_n$ is calculated by using a virtual data quantity at time $t_{n-1}$, the average supply rates at time $t_{n-1}$, and the length of each output period. A predetermined amount of data is supplied to the header adder from one of the input buffers which stores data not less than the predetermined amount during the output period from time $t_n$ to time $t_{n+1}$. Then, the predetermined amount is subtracted from the virtual data quantity in the input buffer which have output data thereof in the output period just after said output period.

BRIEF DESCRIPTION OF THE DRAWINGS

Further objects and advantages of the present invention will be apparent from the following description of the preferred embodiments of the invention as illustrated in the accompanying drawings. In the drawings.

DESCRIPTION OF THE PREFERRED EMBODIMENTS

Figure 1:
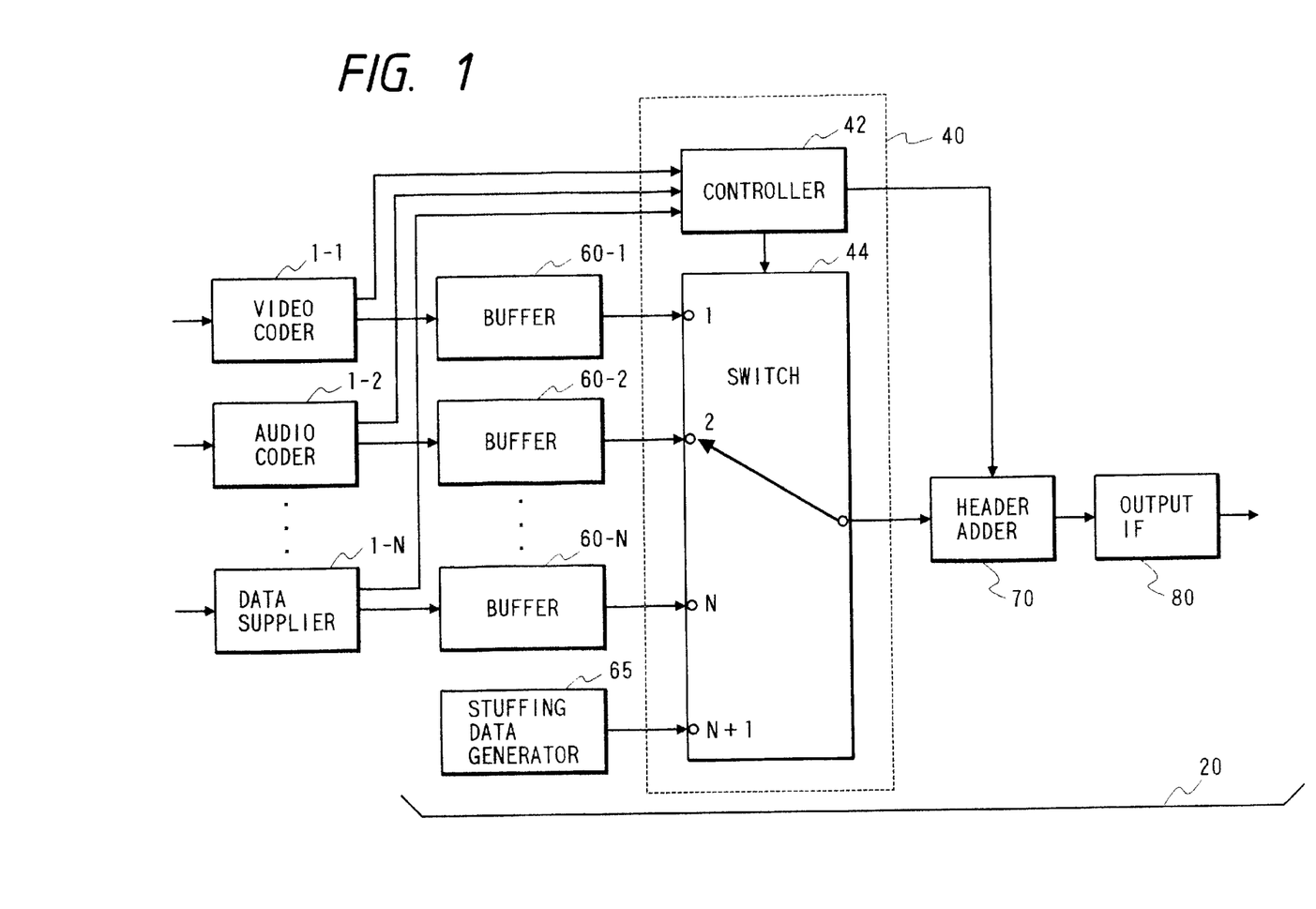
FIG. 1 is a block diagram of an illustrative embodiment of a multiplexer system 20 according to the invention.

FIG. 1 shows a diagram showing an illustrative embodiment of a multiplexer system 20 according to the invention. In FIG. 1, the multiplexer system comprises a plurality of input buffers 60, a stuffing data generator, a multiplexer 40 comprising a switch 44 and a controller 42 for controlling the switch 44, a header adder 70 having its input connected to the output of the switch 44, and an output interface (IF) 80 having its input connected to the output of the header adder 70 and its output connected to an input buffer (not shown) of the data consuming device (not shown). The input terminals of the switch 44 are connected to respective buffer 60 outputs and the output of the stuffing data generator 65.

Figure 2:
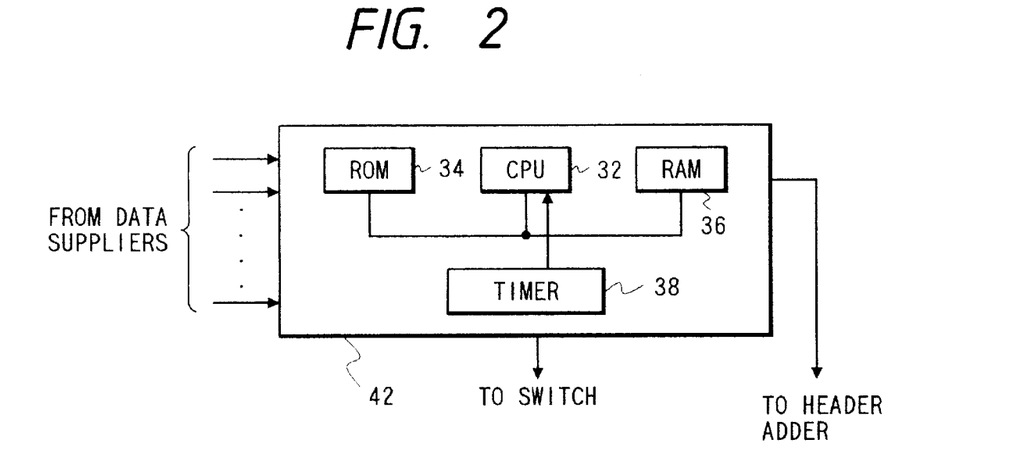
FIG. 2 is a diagram showing a manner in which the data stored in each buffer 60 is output according to the invention when the buffer 60 is supplied with data in bursts.

FIG. 2 shows details of the controller 42 of FIG. 1. As shown in FIG. 2, the controller 42 preferably comprises a central processing unit (CPU) 32, a read only memory (ROM) 34 for storing a program for controlling the CPU, a random access memory (RAM) 36 for use in operation of the CPU, and a timer 38 for generating a clock signal which defines the output period.

The inputs of the buffers 60 are connected to respective data suppliers such as a video coder 1-1, an audio coder 1-2, and any other data suppliers 1-3 through 1-N which each supply time series data in the form of variable-length bursts.

For this reason, each or all of the elements 1-1 through 1-N is or are referred to as "data supplier(s) 1".

Specifically, the video coder 1-1 receives a video signal or time series data from, e. g., a video camera, performs a variable-length compression coding of each picture of the video signal, and outputs the coded picture data in bursts to the input buffer 60-1. Also, the video coder informs periodically the controller 42 of an average supply rate (or average input rate if seen from the multiplexer 40) for a predetermined number of bursts to be subsequently supplied. In the same way, each data supplier 1-i (i=1, 2, . . . ) outputs variable-length bursts of data to an input buffer 60-i, and informs periodically the controller 42 of an average input rate for a predetermined number of bursts to be subsequently supplied.

Figure 3:
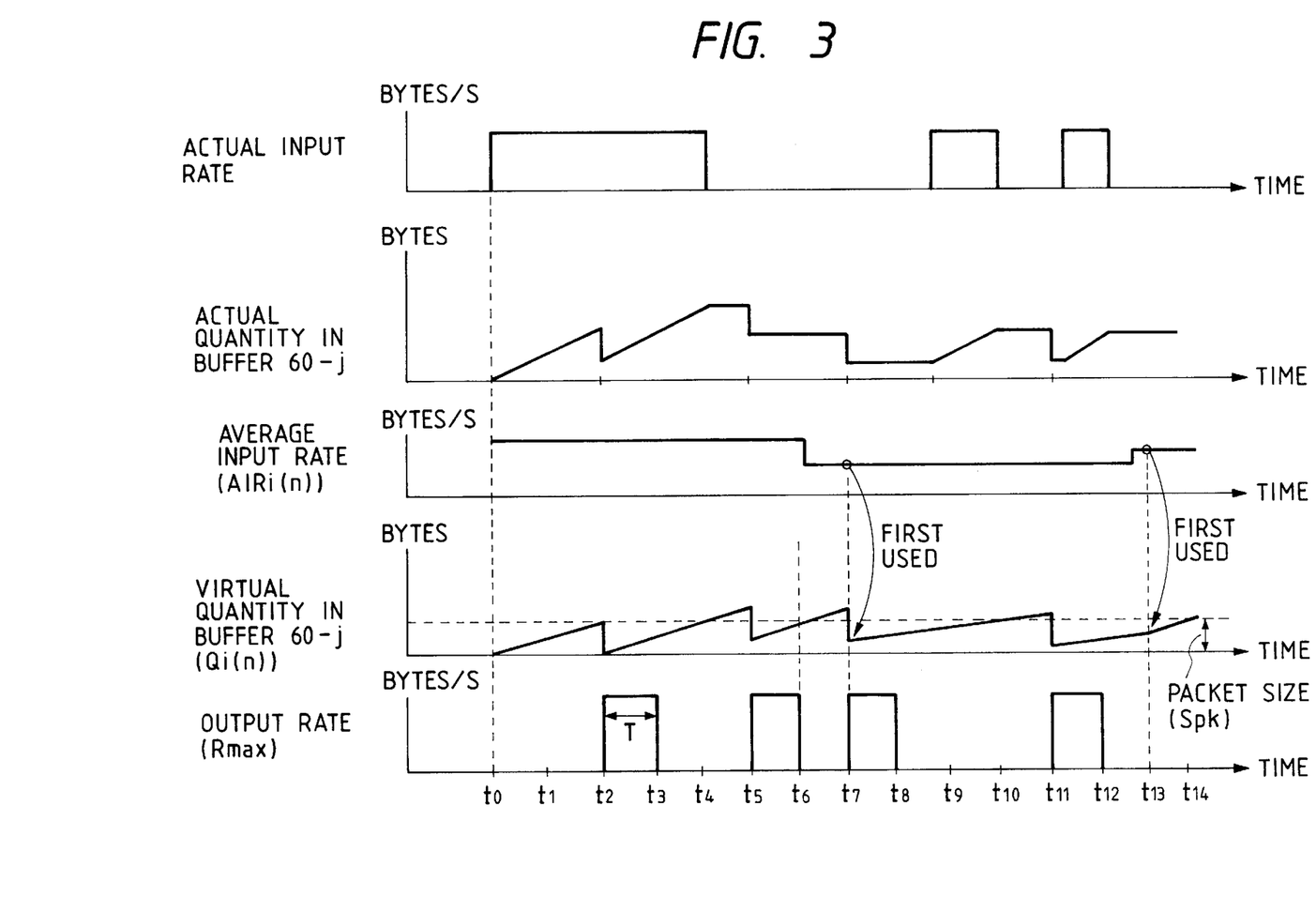
FIG. 3 is a diagram showing details of the controller 42 of FIG. 1.

Referring to FIG. 3, we will discuss "basic concepts" of the invention: how the output of each input buffer 1 is controlled. FIG. 3 shows a manner in which the data stored in each buffer 60 is output according to the invention when the buffer 60 is supplied with data in bursts. In FIG. 3, the actual input rate shows how the input buffer 60 actually receives data bursts, and the average input rate for the buffer 60 shows the values notified by the associated data supplier 1. The average input rate for the buffer 60-i at time $t_n$ is denoted as $AIRi(t_n)$. However, for the sake of the simplicity, $AIRi(t_n)$ is expressed as $AIRi(n)$, where n=0, 1, 2, . . . . It should be noted that the time $t_n$ in this case means the time elapsed from the beginning of a data supply by the buffer 60-i. Therefore, assuming the length of each output period to be T seconds, $t_n$=nT as shown at the bottom of FIG. 3.

The virtual quantity in buffer 60-i at time $t_n$, $Qi(t_n)$ which is again expressed as $Qi(n)$, is calculated by using the average input rate $AIRi(n-1)$. Comparing the average input rate graph with the virtual quantity graph, it is seen that AIRi has changed or has been modified during the 7th period and the 13th period, while the gradient of Qi has changed at time $t_7$ and at time $t_{13}$. This is because the values $AIRi(7)$ and $AIRi(13)$ are used in the calculations of $Qi(8)$ and $Qi(14)$ during the 8th and 14th periods, respectively, which will be detailed later.

A horizontal broken line in the virtual quantity graph shows a packet size Sp or the amount of data output from one of the buffers 60 during an output period T. If it is found in the n-th output period that the virtual quantity at time $t_n$ is equal to or larger than the packet size, then the buffer 60-i is at least a qualified candidate for the (n+1)-th period output through the switch 44. Since there may be two or more such qualified buffers at the same time, it is necessary to prepare an output rule for such cases as will be described in detail later. Comparing the virtual quantity with the output rate, it is seen that the output rate, is shown as the buffer data, is successfully output each time the buffer becomes a qualified candidate for output.

The quantity of data stored in the input buffer in cases when the buffer is supplied with data as shown in the actual input rate graph and have the data thereof output as shown in the output rate graph, changes as shown in the actual quantity in buffer 60-i. As described above, the output rate of the buffer is advantageously averaged in spite of the burst input.

The calculation of the virtual quantity $Qi(n)$ for each buffer 60 will be described in the following. This calculation has to be done every output period from $t_{n-1}$ to $t_n$ in order to decide whether each buffer 60 will be a qualified candidate.

It is assumed that the output rate of each buffer or that of the switch 44 is Rmax bytes/sec, and the length of each output period is constant and equal to T sec. Accordingly, the quantity of data output in each output period or the packet size Sp is constant and equal to T×Rmax.

In order to use the CPU 32 effectively, information on the average input rates is preferably received by means of a well known interrupt routine. Assuming that the information is supplied prior to the supply of the data bursts for which the average input rate is calculated, the controller 42 finds that a buffer 60-i has Just started receiving data when the controller receives the first information on the average input rate for the buffer 60-i.

Considering the period Tst from the beginning of a data supply to the buffer 60-i till the data quantity of the buffer 60-i reaches the packet size Ps, there is the following relation:

$$Ps=Qi(0)+AIRi(0)\times Tst,$$

where $Qi(0)$ and $AIRi(0)$ are an initial value for the virtual quantity in buffer 60-1 and the average input rate for buffer 60-i. It is possible to adjust the first output time to a certain extent by calculating $Qi(0)$ by substituting a desired start time for Tst In the following expression:

$$Qi(0)=Ps-AIR(0)\times Tst.$$

This may be done as a part of initial setting.

Figure 4A:
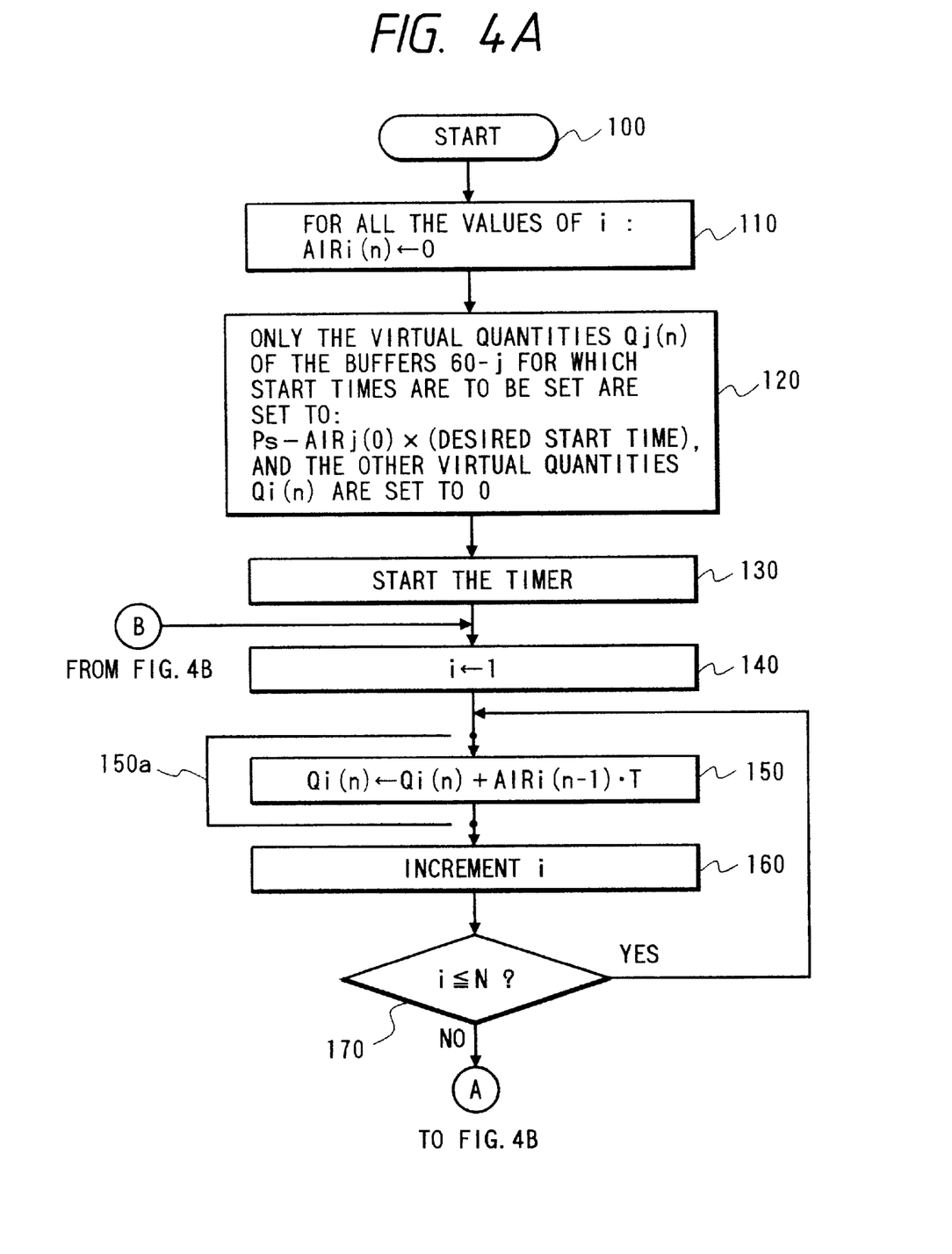
FIG. 4A and 4B are flow charts showing procedures executed by the CPU 32 under the control of the program stored in the ROM 34.

FIG. 4A is a flow chart showing an exemplary operation of the CPU 32 for the calculation of the virtual data quantities for the buffers. When the multiplexer system 20 is started or reset, the operation begins at a start block 100. It is now assumed that the number of the input buffers 60 are N. Then, for all the values of i, that is, for i=1, 2, . . . N, the average input rate $AIRi(n)$ is set to 0 n block 110. If one or more start time(s) is or are desired to be set for specific input buffer(s), only the virtual quantities $Qj(n)$ of the buffers 60-j for which start times are to be set are set to:

Ps−AIRj(0)×(desired start time), and the other virtual quantities $Qi(n)$ are set to 0 in block 120. Then, the operation proceeds to block 130 to start the timer. The initial setting is completed here. The calculation of $Qi(n)$ is started at block 140, where the channel or buffer number i is set to 1. In block 150, the virtual quantity for buffer 60-1 is calculated by using expression:

$$Qi(n)=Qi(n-1)+AIRi(n-1)\times T. \quad (1)$$

Since the current value stored in the location for $Qi(n)$ in the RAM 36 is the value $Qi(n-1)$, then the sum of the value read from the location and $AIRi(n-1)\times T$ is returned to the location. Next, in block 160, the buffer number is incremented, and a check is made to see if the buffer number i is less than or equal to N in block 170. If the answer is YES, then the operation returns to block 150. The above described operation is repeated till the result of the check becomes NO. If the answer is NO in block 170, the operation starts an output buffer selection.

Figure 4B:
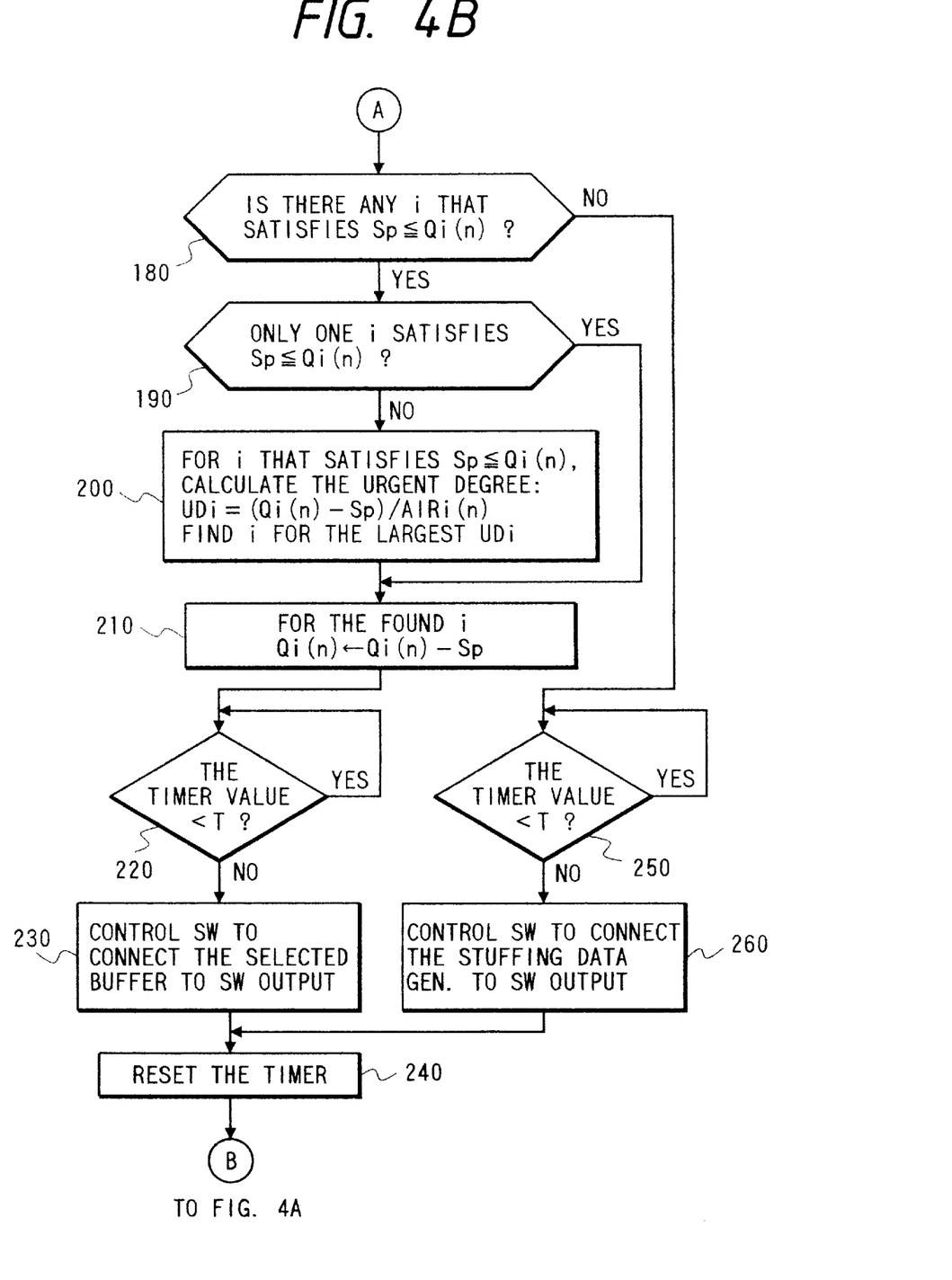

FIG. 4B is a flow chart showing an exemplary operation of the CPU 32 for the output buffer selection. In the operation shown in FIG. 4B, it is decided which of the input buffers 60 and the stuffing data generator 65 connected to the inputs of the switch 44 should be output through the switch 44. Using just calculated $Qi(n)$, a check is made for each i to see if $Sp \leq Qi(n)$ in block 180. If not for any i, then the operation goes to block 250, where the operation waits till it becomes the next output time, when the operation controls the switch 44 to connect the stuffing data generator 65 to the switch 44 output and let the stuffing data generator 65 output predetermined stuffing data for the output period T In block 260. If even one input buffer is found that satisfies Sp≦Qi(n) in block 180, then the operation proceeds to block 190 to make a check to see if there is only one input buffer that contains not less than the packet size Sp. If not, the urgent degree defined as follows:

$$UDi=(Qi(n)-Sp)/AIRi(n)$$

is calculated for each buffer number that satisfies Sp≦Qi(n), and such an input buffer number i as to provide the largest value of UDi in block 200. The urgent degree UDi indicates how long ago the virtual quantity for the input buffer 60-i has reached the packet size. Therefore, the larger the value of UDi is, the higher the urgent degree becomes. If the result of the check in block 190 is YES meaning that one qualified candidate for output was found, or if the operation in block 200 is completed meaning that the buffer whose data is to be output was found, the operation proceeds to block 210, where the virtual quantity for the buffer 66-i whose data is to be output, Qi(n), minus the packet size Sp is calculated and stored to the memory location for Qi(n). Then, in block 220, the operation waits until it becomes the next output time, when the operation controls the switch 44 to connect the selected input buffer and let the input buffer output data thereof for the output period T in block 230. After the operation in block 230 or 260, the timer is reset for the new output period in block 240. Then, the operation returns to block 140.

In the above example, we assumed that the input rate is variable. However, if the input rate is constant and equal to AIRi, the above mentioned expression (1) can be written as:

$$Qi(n)=Qi(n-1)+AIRi \times T.$$

Further, since AIRi×T is constant, the value of AIRi×T is calculated in advance. If the value is ΔQi, the just written expression becomes:

$$Qi(n)=Qi(n-1)+\Delta Qi.$$

Figure 5:
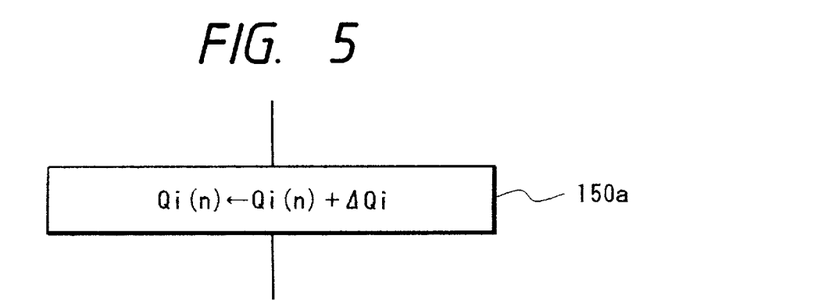
FIG. 5 shows an alternative block for the block 150 of FIG. 4A.

In this case, the operation in block 150 of FIG. 4A can be replaced by a simple operation as shown in block 150a in FIG. 5.

Returning to FIG. 4B, if a unique data source among the input buffers 60 and the stuffing data generator 65 is selected in any of blocks 180 through 200, the controller 42 notifies the number of the switch 44 input terminal to which the unique data source is connected, the amount and the kind of data to be output, etc. to the header adder 70 as well as the switch 44. Then, the header adder 70 adds, to the output packet from the switch 44, the header suited for the specified kind to complete the packet, and outputs the packet to the output interface 80.

Figure 6:
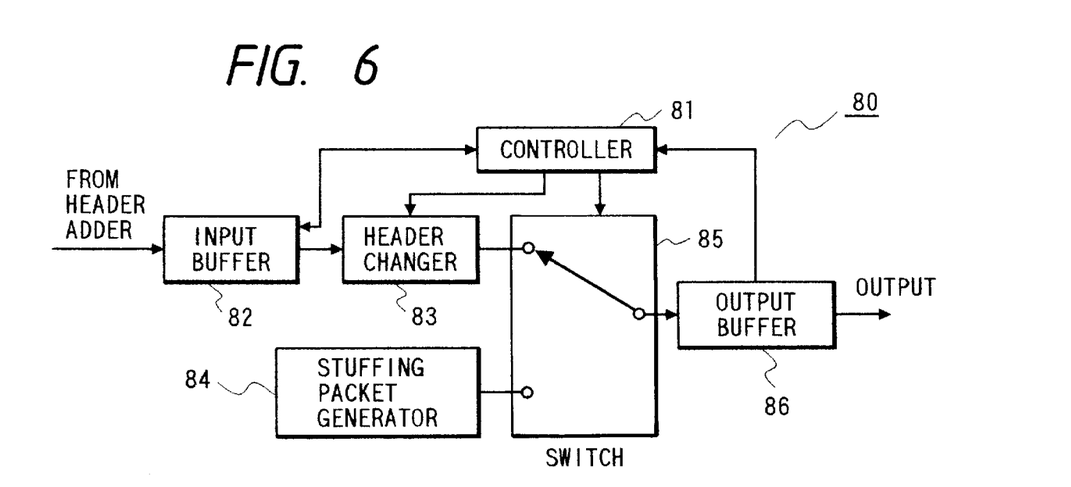
FIG. 6 is a block diagram showing an exemplary arrangement of the output interface 80 of FIG. 1.

FIG. 6 is a block diagram showing an exemplary arrangement of the output interface 80 of FIG. 1. In FIG. 6, the output interface 80 comprises a controller 81, an input buffer memory 82, a header changer 83 for changing the contents in a header field of the packet output from the input buffer memory 82 in response to an instruction if any from the controller 81, a stuffing packet generator 84 for outputting a stuffing packet in response to an instruction from the controller 81, a switch 85 for supplying the output buffer memory 86 with the packet specified by the controller 81, and an output buffer memory 86.

It is noted that the arrangement of the controller 81 is very similar to that of the controller 42 of FIG. 2 except that the contents of the ROMs of the two controllers 81 and 42 are different because of the difference of their controls. Specifically, the controller 81 preferably comprises a CPU, a ROM for storing a program for controlling the CPU, a RAM for use in operation of the CPU, and a timer for generating a clock signal which defines the output period, all of which are not shown.

The input buffer memory 82 temporarily stores each packet supplied from the header adder 70 and sends information on the packet which has been stored, e.g., the kind of the stored packet to the controller 81. In the same way the output buffer memory 86 temporarily stores each packet supplied from the switch 85 and sends information on the packet which has been stored, e.g., the kind of the stored packet to the controller 81.

If the quantity of data in the output buffer memory 86 is less than a predetermined quantity, the controller 81, in response to the determination that the quantity of data in the input buffer memory 82 is not less than the predetermined quantity, sends an instruction to the input buffer memory 82 that the packet staying for the longest time should be output to the header changer 83, and, in response to the determination that the quantity of data in the input buffer memory 82 is also less than the predetermined quantity, sends an instruction to the stuffing packet generator 84 that a stuffing packet should be output. In this case, the controller 81 also informs the switch 85 of the packet to be sent to the output buffer memory 86. If the header of the packet to be output from the input buffer memory 82 has to be changed, the controller 81 sends an instruction about the necessary change to the header changer 83.

Figure 7:
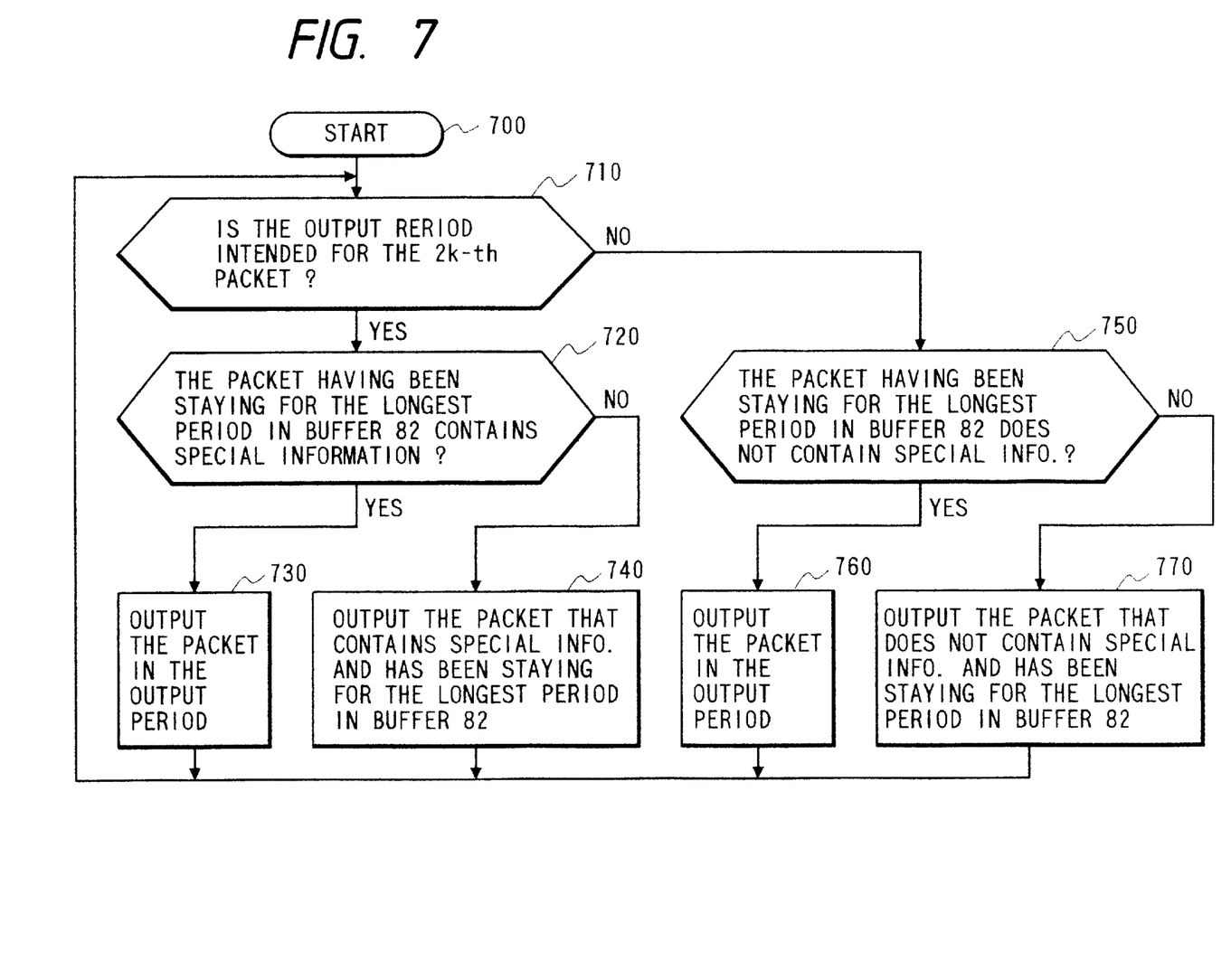
FIG. 7 is a flow chart showing a procedure executed by the controller 81 shown in FIG. 6.

Referring to FIG. 7, we discuss a control for ensuring that the packets containing a certain special information is output in the output period for the 2k-th packet, where k=1, 2, . . . . In FIG. 7, the control begins at block 700 and proceeds to block 710, where a check is made to see if the coming output period is intended for the 2k-th packets. If so, the controller 81 makes another check to see if the packet having been staying for the longest period in the input buffer memory 82 contains the special information in block 720. If so, then the packet is output in the coming output period in block 730. Otherwise, in block 740, the controller 81 outputs in the coming output period the packet that contains the special information and has been staying for the longest period in the input buffer 82. If the check result is NO in block 710, then the control is passed to 750. where a check is made to see if the packet having been staying for the longest period in the input buffer memory 82 does not contain the special information in block 750. If so, the packet is output in the coming output period in block 760. Otherwise, in block 770, the controller 81 outputs in the coming output period the packet that does not contains the special information and has been staying for the longest period in the input buffer 82. The above described procedure is repeated every output period.

As described above, the calculation of the virtual quantity Qi for all the input buffers 60 and the selection among the data sources 60 and 65 connected to the switch 44 input terminals has to be completed in each output period, that is, the operations from block 140 in FIG. 4A to block 240 in FIG. 4B has to be done in each output period. However, this may become impossible with the increase in the number of the data suppliers 1.

If the input rate for some data supplier 1 is substantially smaller as compared with the output rate of the multiplexer 40. the increase in the virtual quantity for each output period is so small that the virtual quantity seldom reaches the packet size in each comparison thereof.

Therefore, for such a data supplier with a small input rate, it is preferable to perform the calculation of the virtual input rate every such a predetermined number of output periods, instead of every output period, that the increase in the virtual quantity for the predetermined number of output periods is less than the packet size. Specifically, if the virtual quantity in a buffer for each data supplier 1-i is to be calculated every Ji output periods for example, then the expression for the virtual quantity in this case will be written, by expanding the expression (1), as follows:

$$Qi(n)=Qi(n-Ji)+AIRi(n-1)\times T\times Ji,$$

where Ji is an integer not less than 1.

Figure 8:
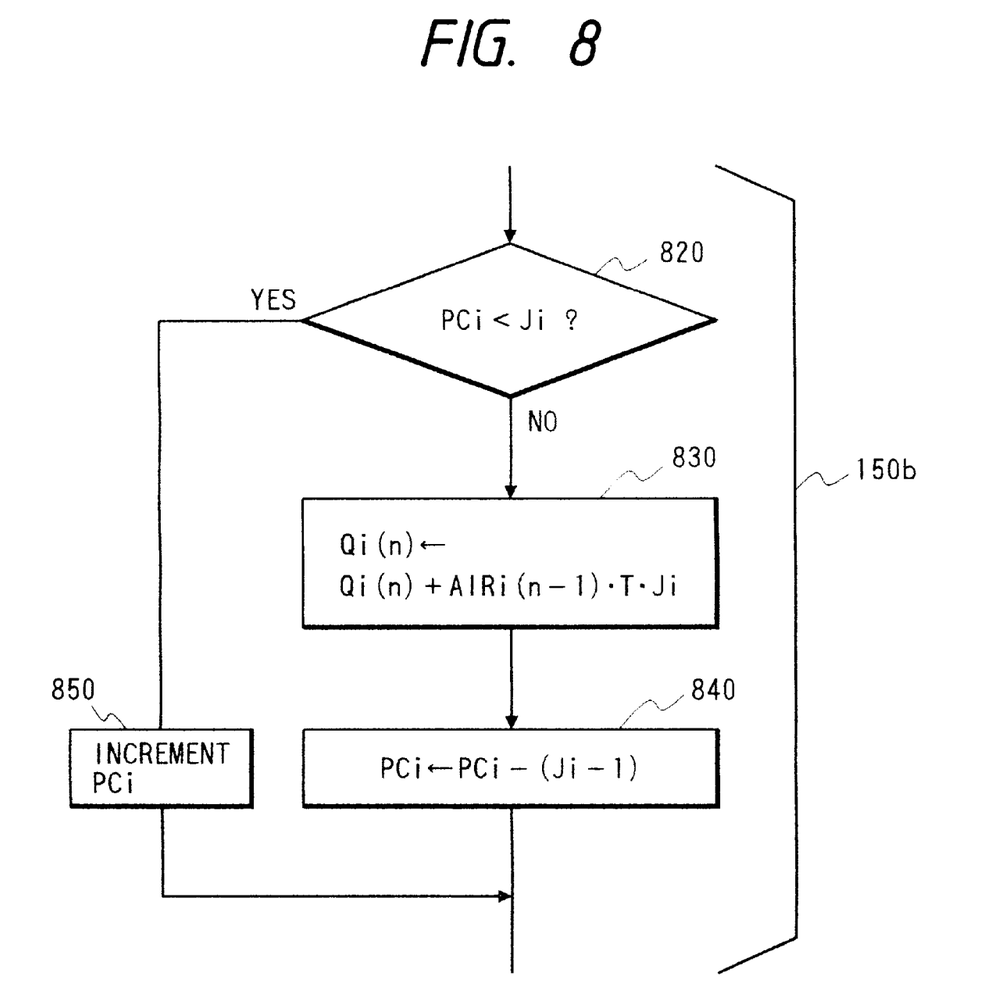
FIG. 8 is a flow chart of alternative procedures for the procedure 150a in FIG. 4A.

Referring now to FIG. 8. we discuss how to embody this as an operation executable by the CPU 32. FIG. 8 shows a flow chart 150b of alternative procedures for the procedure 150a in FIG. 4A.

After block 130 in FIG. 4A, the operation proceeds to block 820 in FIG. 8, where a check is made to see if the pass count for the buffer 600i, PCi is less than Ji. It is assumed that the pass counts for all the buffers have been set for 1 in one of the initial setting procedures such as block 110 in FIG. 4A. If the answer is YES in decision block 820, then the pass count PCi is incremented in block 850. The subsequent procedures are identical to the blocks after 160 of FIG. 4A. If the answer is NO in decision block 820, the virtual quantity Qi(n) is calculated by storing the current virtual quantity Qi(n) value plus AIRi(n-1) in the memory location for Qi(n) in block 830. Then, the value (Ji-1) is subtracted from the PCi in block 840. Thereafter, the operation proceeds to block 160 in FIG. 4A.

Many widely different embodiments of the present invention may be constructed without departing from the spirit and scope of the present invention. It should be understood that the present invention is not limited to the specific embodiments described in the specification, except as defined in the appended claims.

What is claimed is:

1. In a system comprising a multiplexer having a plurality of input buffers, a plurality of data suppliers, each supplying, in the form of variable-length burst data stream, time series data received from the outside to one of said plurality of input buffers and informing said multiplexer of an average supply rate for a predetermined number of data bursts to be subsequently supplied, a header adder, and an output interface, a method for converting the plurality of variable-length burst data streams into a multiplexed averaged-transfer-rate fixed-length packet stream, wherein a series of output periods for said multiplexed output steam begins when one of said data suppliers starts a data supply for the first time, the method comprising the steps of:

within each output period defined as a time period from time $t_{n-1}$ to time $t_n$ (n=0, 1, 2, . . . ; output period number), calculating for each of said plurality of input buffers Bi, a virtual data quantity in said input buffer Bi at the time $t_n$ by using a virtual data quantity at time $t_{n-1}$, the average supply rates at time $t_{n-1}$, and the length of each output period;

supplying said header adder with a predetermined amount of data from one of the input buffers which stores data not less than said predetermined amount of data during an output period from time $t_n$ to time $t_{n+1}$; and subtracting said predetermined amount from the virtual data quantity in the input buffer which have output data thereof in the output period just after said output period; and wherein said step of calculating a virtual data quantity comprises the steps of calculating said virtual data quantity as follows:

$$Qi(t_n)=Qi(t_{n-1})+AIRi(t_{n-1})\times Tp,$$

where $Qi(t_n)$ and $Qi(t_{n-1})$ are the virtual data quantities in the input buffer Bi at times $t_n$ and $t_{n-1}$ respectively, $AIRi(t_{n-1})$ is said average supply rate at time $t_{n-1}$, and Tp is said length of each output period.

2. The method as defined in claim 1, further comprising the step of supplying said header adder with said predetermined amount of predetermined stuffing data during said output period from time $t_n$ to time $t_{n+1}$ in the event none of said plurality of input buffers contains data not less than said predetermined amount data.

3. The method as defined in claim 1, wherein said step of supplying said header adder includes the step of selecting, as said one of the input buffers, the input buffer the virtual data quantity of which is the first to reach said predetermined amount having data not less than said output packet size.

4. The method as defined in claim 1, wherein:

said step of calculating a virtual data quantity includes the step of using, as said average supply rates at time $t_{n-1}$, a constant average supply rate supplied at the start time Tb of the data supply to said input buffer Bi.

5. The method as defined in claim 1, wherein said step of calculating a virtual data quantity includes the step of:

for a specified one of said plurality of input buffers, calculating, every integer times an output period, a virtual data quantity in said specified input buffer at time t by using a last calculated virtual data quantity at time ($t_{n-said\ integer}$), the average supply rates at time ($t_{n-said\ integer}$), and the length of each output period.

6. The method as defined in claim 1, further comprising the step, preceding said step of calculating a virtual data quantity, of:

calculating an initial virtual data quantity for t=Tb for a specified one of said plurality of input buffers so that data stored in said specified one of said plurality of input buffers is output a desired number of output periods after the start time Tb of the data supply to said specified input buffer.

7. A system for converting a plurality of variable-length burst data streams into a multiplexed averaged-transfer-rate fixed-length packet streams, the system comprising:

a plurality of input buffers each storing data supplied in variable-length bursts from one of a plurality of data suppliers, a multiplexer, operative on the basis of information, from each of said data supplier, on an average supply rate for a predetermined number of data bursts to be subsequently supplied to the input buffer connected to said data supplier, for outputting a multiplexed predetermined-amount output stream from said input buffers;

a header adder for adding an appropriate header to each output in said multiplexed predetermined-amount output stream; and an output interface for receiving packets from said header adder and outputting said multiplexed averaged-transfer-rate fixed-length packet stream, wherein a series of output periods for said multiplexed fixed-length output stream begins when one of said data suppliers starts a data supply for the first time, and wherein said multiplier further comprises:

means, operative within each output period defined as a time period from time $t_{n-1}$ to $t_n$ (n=0, 1, 2, . . . : output period number), for calculating for each of said plurality of input buffers Bi a virtual data quantity in said input buffer Bi at the time $t_n$ by using a virtual data quantity at time $t_{n-1}$, the average supply rates at time $t_{n-1}$, and the length of each output period;

means for supplying said header adder with a predetermined amount of data from one of the input buffers which stores data not less than said predetermined amount of data during an output period from time $t_n$ to time $t_{n+1}$; and means for subtracting said output packet size from the virtual data quantity in the input buffer which have output data thereof in the output period just after said output period; and wherein said means for calculating a virtual data quantity comprises means for calculating said virtual data quantity as follows:

$$Qi(t_n)=Qi(t_{n-1})+AIRi(t_{n-1}) \times Tp,$$

where $Qi(t_n)$ and $Qi(t_{n-1})$ are the virtual data quantities in the input buffer Bi at times $t_n$ and $t_{n-1}$ respectively, $AIRi(t_{n-1})$ is said average supply rate at time $t_{n-1}$, and Tp is said length of each output period.

8. The system as defined in claim 7, wherein said multiplexer further comprises means for supplying said header adder with said predetermined amount of predetermined stuffing data during said output period from time $t_n$ to time $t_{n+1}$ in the event none of said plurality of input buffers contains data not less than said predetermined amount.

9. The system as defined in claim 7, wherein means for supplying said header adder includes means for selecting, as said one of the input buffers, the input buffer the virtual data quantity of which is the first to reach said predetermined amount of data and which contains data which is not less than said output packet size.

10. The system as defined in claim 7, wherein:

said means for calculating a virtual data quantity includes means for using, as said average supply rates at time $t_{n-1}$, a constant average supply rate supplied at the start time Tb of the data supply to said input buffer Bi.

11. The system as defined in claim 7, wherein said means for calculating a virtual data quantity includes means, operative for a specified one of said plurality of input buffers, for calculating every integer times an output period, a virtual data quantity in said specified input buffer at time t by using a last calculated virtual data quantity at time $(t_{n-said\ integer})$, the average supply rates at time $(t_{n-said\ integer})$, and the length of each output period.

12. The system as defined in claim 7, wherein said multiplexer further comprises means, activated prior to operation of means for calculating a virtual data quantity, for calculating an initial virtual data quantity for t=Tb for a specified one of said plurality of input buffers so that data stored in said specified one of said plurality of input buffers is output a desired number of output periods after the start time Tb of the data supply to said specified input buffer.

13. In a system comprising a multiplexer having a plurality of input buffers, a plurality of data suppliers, each supplying, in the form of variable-length burst data stream, time series data received from the outside to one of said plurality of input buffers and informing said multiplexer of an average supply rate for a predetermined number of data bursts to be subsequently supplied, a header adder, and an output interface, a method for converting the plurality of variable-length burst data streams into a multiplexed averaged-transfer-rate fixed-length packet stream, wherein a series of output periods for said multiplexed output steam begins when one of said data suppliers starts a data supply for the first time, the method comprising the steps of:

within each output period defined as a time period from time $t_{n-1}$ to time $t_n$ (n=0, 1, 2, . . . ; output period number), calculating for each of said plurality of input buffers Bi, a virtual data quantity $Qi(t_n)$ in said input buffer Bi at the time $t_n$ by using a virtual data quantity at time $t_{n-1}$, the average supply rates at time $t_{n-1}$, and the length of each output period as:

$$Qi(t_n)=Qi(t_{n-1})+AIRi(t_{n-1}) \times Tp,$$

where $Qi(t_n)$ and $Qi(t_{n-1})$ are the virtual data quantities in the input buffer Bi at times $t_n$ and $t_{n-1}$ respectively, $AIRi(t_{n-1})$ is said average supply rate at time $t_{n-1}$, and Tp is said length of each output period;

supplying said header adder with a predetermined amount of data from one of the input buffers which stores data not less than said predetermined amount of data during an output period from time $t_n$ to time $t_{n+1}$;

subtracting said predetermined amount from the virtual data quantity in the input buffer which have output data thereof in the output period just after said output period; and rearranging the order of output of the packets received from said header adder so that one(s) of said packets which contains (or contain) a certain special information is (or are) output in predetermined output periods.

14. The method as defined in claim 13, wherein said step of rearranging the order includes the step of selecting output periods denoted by even output period counts as said predetermined output periods.

15. A system for converting a plurality of variable-length burst data streams into a multiplexed averaged-transfer-rate fixed-length packet stream, the system comprising:

a plurality of input buffers Bi, each storing data supplied in variable-length bursts from one of a plurality of data suppliers, a multiplexer, operative on the basis of information, from each of said data supplier, on an average supply rate for a predetermined number of data bursts to be subsequently supplied to the input buffer connected to said data supplier, for outputting a multiplexed predetermined-amount output stream from said input buffers;

said multiplexer further comprising:

means, operative within each output period defined as a time period from time $t_{n-1}$ to $t_n$ (n=0, 1, 2, . . . : output period number), for calculating for each of said plurality of input buffers Bi a virtual data quantity in said input buffers Bi at the time $t_n$ by using a virtual data quantity at time $t_{n-1}$, the average supply rates at time $t_{n-1}$, and the length of each output period;

a header adder for adding an appropriate header to each output in said multiplexed predetermined-amount output stream;

an output interface for receiving packets from said header adder and outputting said multiplexed averaged-transfer-rate fixed-length packet stream, wherein a series of output periods for said multiplexed fixed-length output stream begins when one of said data suppliers starts a data supply for the first time, and including means for rearranging the order of output of the packets which have been received from said header adder so that one(s) of said packets which contains (or contain) a certain special information is (or are) output in predetermined output periods;

means for supplying said header adder with a predetermined amount of data from one of the input buffers which stores data not less than said predetermined amount of data during an output period from time $t_n$ to time $t_{n+1}$; and means for subtracting a packet size of an output packet of said multiplexed averaged transfer-rate fixed length data stream from the virtual data quantity in the input buffer which have output data thereof in the output period just after said output period.

16. The system as defined in claim 15, wherein said means for rearranging the order includes means for selecting output periods denoted by even output period counts as said predetermined output periods.

* * * * *